Figure 1:
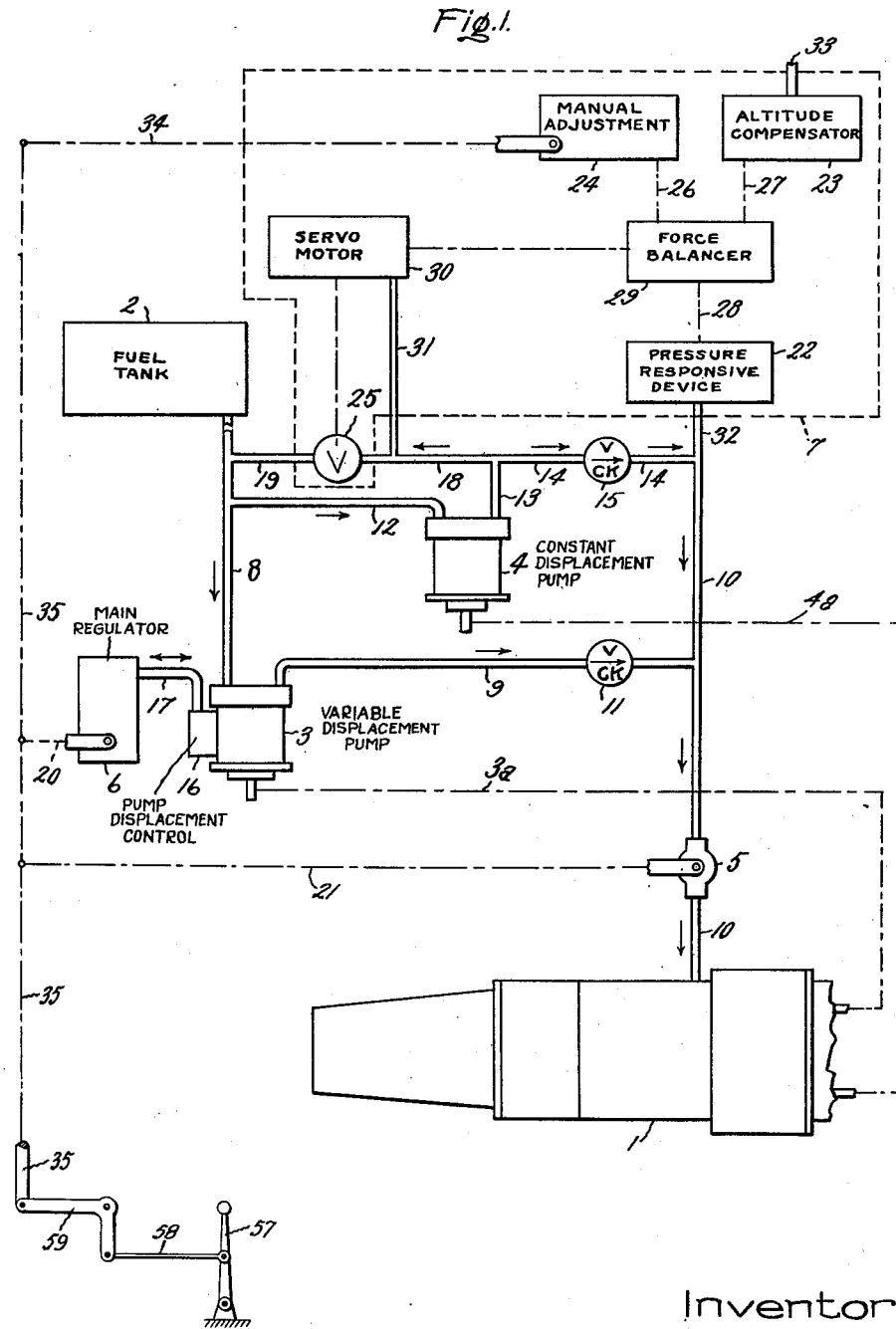

June 3, 1952 N. BURGESS 2,598,674
FUEL SYSTEM FOR THERMAL POWER PLANTS
Filed July 6, 1949 2 SHEETS—SHEET 2

Inventor:
Neil Burgess,
by Burrell S. Mark
His Attorney.

Patented June 3, 1952

2,598,674

UNITED STATES PATENT OFFICE 2,598,674

FUEL SYSTEM FOR THERMAL POWER PLANTS

Neil Burgess, Melrose, Mass., assignor to General Electric Company, a corporation of New York Application July 6, 1949, Serial No. 103,264

5 Claims. (Cl. 158—36.4)

This invention relates to thermal-powerplants and particularly to fuel systems for supplying fuel to such powerplants. It is of particular significance in connection with powerplants for aircraft service.

Control of gas turbine powerplants for aircraft service presents an extremely difficult problem due to the various changes in operating conditions to which these powerplants are subjected. These variations may cover a wide range of ambient atmospheric pressure, temperature, speed and load, thus requiring correspondingly great changes in the rate of fuel supply. Thermal powerplants used for the propulsion of aircraft may comprise a compressor, combustion chambers and a turbine arranged in series flow relation to keep powerplant weight and overall diameter to a minimum. Such powerplants must operate from seal level to very high altitudes, often exceeding 35,000 feet. Since this type of powerplant employs components of the so-called constant volume type, the weight flow of air through the powerplant under varying altitude conditions may vary in the order of 10–20 to 1 and therefore the fuel flow range must vary approximately in the same order of magnitude. Control of the flow of fuel to the powerplant is often effected by various regulating devices which may be of the type which are hydraulically actuated by servomotor means employing oil or a similar fluid. Because the viscosity of oil increases with decreasing temperature, starting of the powerplant becomes very difficult and in some cases impossible under low temperature atmospheric conditions, since the regulating devices may be rendered temporarily inoperative due to congealing of the hydraulic fluid or oil. Another problem which is of particular significance in aircraft service is in the provision of an emergency fuel system, a mandatory requirement in aircraft service for safety reasons. An emergency system must be capable of providing uninterrupted flow of fuel to the powerplant in the event of failure of the main fuel system.

Accordingly, an object of the invention is to provide a novel and improved fuel system for thermal power plants which obviates the above-mentioned difficulties.

Another object of the invention is to provide a fuel system for thermal powerplants which provides new and improved means for starting and operating such powerplants under extreme low temperature ambient atmospheric conditions.

Still another object of the invention is to provide a new and improved fuel system arrangement whereby efficient control and safe operation of the powerplant are assured even in the event of failure of various components of the system.

A further object of the invention is to provide a new and improved fuel system arrangement whereby certain components of the system perform the dual function of serving as temporary means for starting and operating the powerplant under certain operating conditions and also serve as emergency components of the dual system to permit uninterrupted operation in the event of failure of other components of the system.

Figure 2:
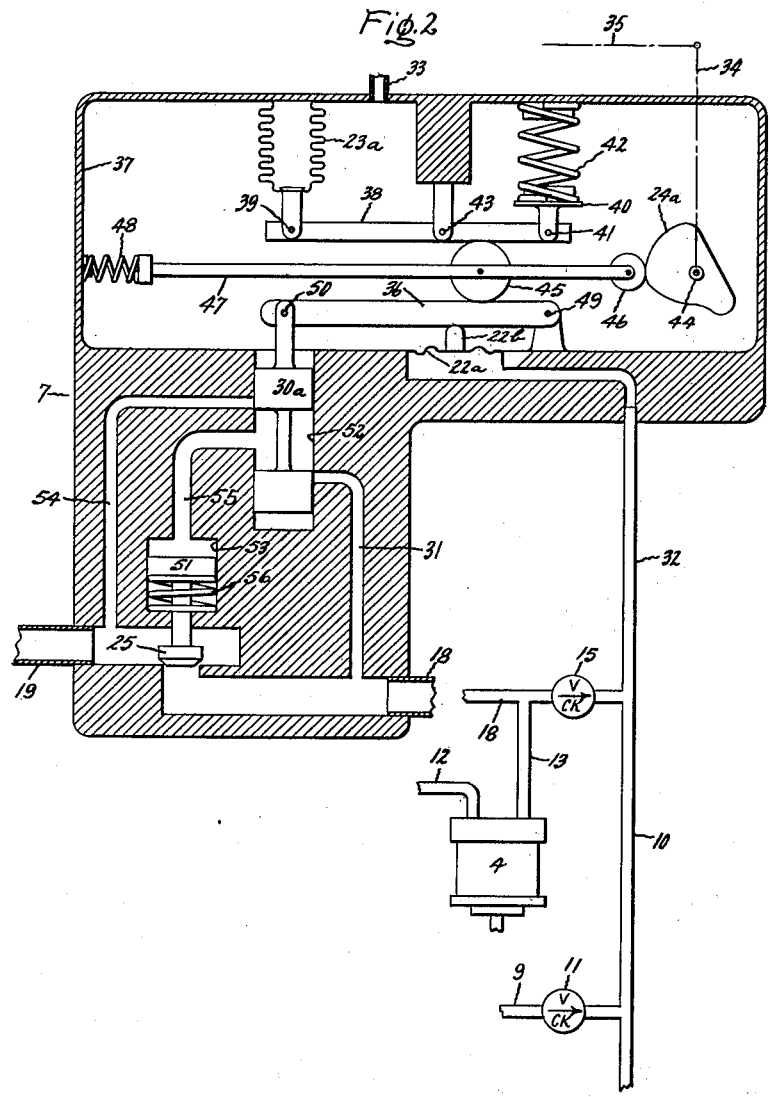

Other objects and advantages will be apparent from the following description taken in connection with the accompanying drawings in which Fig. 1 illustrates a fuel system in accordance with the invention; and Fig. 2 is a diagrammatic view showing the arrangement of emergency components of the system shown in Fig. 1.

Referring now to the drawing, a gas turbine powerplant I may comprise a compressor, combustion chambers, and a turbine arranged in series flow relation. The compressor receives air from the ambient atmosphere and delivers it at increased pressure and temperature to the combustion chambers. Fuel is introduced and mixed with this air to form a combustible mixture which is burned in the combustion chambers thus raising the temperature of the air to a relatively high level before it is delivered to the turbine. The resulting high temperature products of combustion under pressure are employed as motive fluid for the turbine which extracts at least sufficient power to drive the compressor and certain accessories necessary to the operation of the powerplant. The remaining power is available for propulsion of the aircraft either as mechanical power for driving a propeller, or by discharging the fluid at high velocity relative to the aircraft and in a direction opposite to that of flight as in jet propelled aircraft. Powerplants of this type are provided with an accessory section comprising suitable mounting pads and gearing for driving various accessories including fuel and lubrication pumps as indicated by broken lines 3a and 4a. The details of such powerplants are not material to an understanding of the present invention and are more particularly described in U. S. Patents 2,432,359 Streid, 2,479,573 Howard, and in co-pending application Serial No. 541,565, filed June 22, 1944, in the name of Alan Howard and assigned to the same assignee as the present application.

My improved fuel system is illustrated in Fig. 1 includes a fuel tank or reservoir 2, a main fuel pump 3, a second or emergency fuel pump 4, a shut-off valve or stopcock 5, a first regulator 6 referred to herein as the main regulator, and a second regulator 7 referred to herein as the emergency regulator.

A conduit 8 is provided for conveying fuel from the reservoir 2 to the main pump 3. The pump 3 delivers fuel under pressure through conduits 9, 10 to stopcock 5 and then to the powerplant through conduit 10. A check valve 11 is provided in conduit 9 to prevent backward flow of fuel through pump 3. Pump 4 is connected in parallel with pump 3 by an inlet branch conduit 12 and discharge conduit 13. Discharge conduit 13 is connected to conduit 14 and then to conduit 10 at a location upstream from the stopcock 5. Thus, it will be apparent that fuel delivered by either pump may reach the powerplant. A second check valve 15 is provided in conduit 14 for preventing the backward flow of fuel through pump 4. The main pump 3 which is of the variable displacement type, is connected to the main regulator 6 by a pump control 16, associated with pump 3, and a connecting conduit 17 for receiving a variable hydraulic pressure signal from the main regulator 6. A more complete description of the main fuel pump 3, regulator 6, and pump control 16 will be given presently.

Discharge conduits 13, 14 are connected to inlet conduit 8 by means of a second or emergency regulator 7 in series with connecting conduits 18, 19. This arrangement permits variable portions of the fuel delivered by pump 4 to be directed to the powerplant in the manner previously described, or, by-passed to the common inlet 8 of both pumps. Additional description of regulator 7 and its function will follow as the description proceeds.

Main fuel pump and displacement control

The main fuel pump is of the variable displacement type and supplies fuel to the powerplant at a rate of flow dictated by the fuel regulator 6. An integral part of the pump 3 is a small constant displacement internal gear pump (not shown) which furnishes oil at a relatively low pressure to the fuel regulator 6. This low pressure oil lubricates the fuel regulator and the main bearings of pump 3. A wobble plate (not shown) co-axial with the pump drive shaft is arranged so that the slope of the wobble plate may be varied with respect to the axis of the pump shaft for varying the displacement of the pump.

A hydraulically actuated servomechanism or pump displacement control 16 is connected to the pump for varying the slope of the wobble plate, relative to the axis of the pump shaft in response to a variable hydraulic pressure signal received from regulator 6 through conduit 17. A pump of this type and its associated displacement control 16 are more particularly described in a co-pending application in the name of Donald E. Garr and Martin A. Edwards, Serial No. 718,580, filed December 26, 1946, and assigned to the same assignee as the present application.

Main fuel regulator

The purpose of the main fuel regulator 6 is to control the rate of fuel flow to the powerplant as a function of the position of a manual adjustment lever 20 and thus to secure a desired output of the powerplant. A number of distinct condition responsive control devices are provided in the regulator to vary a control pressure generated by the regulator automatically in response to changes of certain powerplant operating conditions, as well as other mechanism for manipulation by the operator to select the desired load output of the powerplant.

Within the regulator is a control oil pump (not shown) which furnishes pressurized oil to the regulator components. This pump obtains its oil from within the regulator casing which is in turn supplied with low pressure oil by the oil pump incorporated in the main fuel pump 3, as previously indicated. The condition responsive control devices within the regulator vary the control pressure output of the regulator in accordance with a preselected schedule and in response to changes in certain operating conditions of the powerplant which may include position of the adjustment manual lever 20, a pressure at which the powerplant is operating, a temperature level at which the powerplant is operating, rotational speed of the powerplant, and an altitude responsive device arranged to recalibrate the regulator so that a given position of the adjustment lever 20 always produces a predetermined percentage of full load rating irrespective of altitude.

The variable control pressure output of regulator 6 is connected to the pump control 16 by conduit 17. Variations in the control pressure are thus transmitted to the pump control which effects changes in the displacement of pump 3 in accordance with the operating needs of the powerplant. A regulator of this type is more particularly described in a co-pending application in the name of Martin A. Edwards, Donald E. Garr, and Hugh M. Ogle, Serial No. 605,960, filed July 19, 1945, and assigned to the same assignee as the present application.

Emergency fuel pump

The emergency fuel pump 4 is of the constant displacement type and is directly connected to a powerplant mounting pad as previously indicated. Therefore, the rotational speed and thus the rate of fuel delivery by the pump is a function of the rotational speed of the powerplant.

Shut-off valve

The fuel shut-off valve 5 is intended for use in its wide open or closed positions only. Suitable linkage indicated by broken line 21 is provided so that movement of the operator's control lever 57 is transmitted to the stopcock. The connecting linkage is so proportioned that the stopcock is quickly moved to its full open position in approximately the first 10 degrees of movement of the operator's control lever. A valve of this type is more particularly described in co-pending applications Serial No. 630,673, filed November 24, 1945, now matured into Patent 2,485,349, and Serial No. 682,554, filed July 10, 1946, now Patent 2,510,617, in the name of Samuel R. Barr, and assigned to the same assignee as the present application. Connecting linkage of the type described is more particularly described in the co-pending application of Edwards, Garr, and Ogle, previously referred to.

Emergency regulator

Emergency regulator 7, is a second device for controlling the rate of flow of fuel bypassed through conduits 18, 19 to the common inlet conduit 8.

A number of condition-responsive devices which may include a device 22 responsive to a pressure appurtenant to the operation of the powerplant, an altitude compensating device 23, and a manually adjustable device 24 for preselecting a desired rate of by-pass fuel flow are provided for influencing the functioning of a valve 25 which is connected in series with bypass conduits 18, 19. These condition-responsive devices are connected together by suitable linkage indicated by broken lines 26, 27, 28 to a force balancing system 29. When the forces acting on the force-balancing system 29 become unbalanced as a result of change in signal from one or all of the condition-responsive devices 22, 23, 24, the linkage members are caused to move so as to impart positional changes to a pilot device which is part of a servomotor 30 for effecting positional changes of valve 25. A feature of the invention is that the actuating fluid for servomotor 30 is the fuel which is delivered to the power plant.

The pressure-responsive device 22 is arranged to sense the pressure of the fuel delivered to the powerplant. As illustrated in the drawings, pressure-responsive device 22 is connected to conduit 10 by conduit 32 at a location upstream from stopcock 5. It is to be understood, however, that conduit 32 may be connected to conduit 10 at any desired location between the powerplant 1 and the discharge of pump 4. The altitude compensating device is arranged to sense the ambient atmospheric pressure by a sensing conduit 33 which connects the compensator to any desired location for sensing this pressure. For example, conduit 33 may be arranged to sense the pressure at the inlet (not shown) of the powerplant.

Referring now to Fig. 2, the pressure responsive device 22 comprises a flexible diaphragm 22a which is arranged to sense the pressure in conduit 32. A bearing member 22b is secured to the diaphragm so as to bear against linkage member 36. Thus, it will be seen that bearing member 22b exerts a variable upward force on linkage member 36, and that the magnitude of the variable force is directly proportional to the pressure existing in conduit 32.

The altitude compensator 23 comprises an evacuated flexible bellows 23a secured at one end to a casing 37. The opposite end of the bellows is connected to one end of another linkage member 38 by pivot 39. The right hand end of member 38 carries a support member 40 pinned thereto by a pin 41 for supporting a compression spring 42. Linkage member 38 is also pinned to casing 37 by pin 43 and is free to pivot relative thereto as bellows 23a expands or contacts. The spring 42 is under at least slight compression when the right hand end of linkage member 38 is moved to the limit of its travel in a downward direction, or in other words, when bellows 23a is completely contracted. The casing 37 is provided with an opening to receive conduit 33, which as previously indicated is arranged to sense the ambient atmospheric pressure. Since the casing 37 is vented to the ambient atmosphere, the evacuated bellows will contract at high atmospheric pressure and will expand as the atmospheric pressure decreases.

The manual adjustment 24 comprises a cam 24a secured to a shaft 44 which is in turn rotatably supported by casing 37. An end portion (not shown) of shaft 44 projects through the casing wall and a linkage member 34 is secured thereto for effecting angular adjustment of cam 24a. Roller members 45, 46 are rotatably supported in spaced relation by a third linkage member 47 which is in turn biased toward cam 24a under the action of compression spring 48 so that roller 46 is always in engagement with the surface of the cam.

Diaphragm 22a, bearing member 22b, linkage member 36, bellows 23a, spring 42, linkage member 38, and roller 45 constitute the force balancing system 29 of Fig. 1. The combined effect of the force resulting from atmospheric pressure acting on the effective area of the bellows and the spring force acting in a downward direction through roller 45 on linkage member 36 must be exactly balanced by the upward force produced by the fuel pressure in conduit 32 acting on the under side of diaphragm 22a for a condition of equilibrium to exist.

The right hand end of linkage member 36 is supported by a pivot 49. Under equilibrium conditions, member 36 remains stationary, and during any other condition is caused to rotate about pivot 49 in a direction in accordance with the momentary unbalance of the forces acting thereon.

The servo motor comprises a pilot valve 30a connected to the left hand end of member 36 by pin 50 and piston 51 which is secured to valve 25. Pilot valve 30a and piston 51 are arranged to slide in cylindrical bores 52, 53 respectively, provided in casing 37. Passages 31, 54, 55 provided in casing 37 establish communication between conduit 18, conduit 19, and cylinder bore 53, respectively, and the pilot valve 30a. The dimensions of valve 30a and the locations at which passages 31, 54, 55 communicate with the pilot valve are proportioned so that a downward movement of valve 30a from the position indicated in Fig. 2 establishes communication between passages 31 and 55 and admits fuel substantially at the discharge pressure of pump 4 to the upper side of piston 51. In a like manner, when pilot valve 30a moves upward from the position shown in Fig. 2, communication is established between passages 54, 55, thus allowing relatively high pressure fuel to be discharged from the upper side of piston 51 to conduit 19 at the downstream side of valve 25, piston 51 being biased in an upward direction by compression spring 56. The position of pilot valve 30a shown in Fig. 2 corresponds to the equilibrium position, previously referred to, of linkage member 36.

The function of the regulator is to control the rate at which fuel is by-passed from the discharge of pump 4 so as to maintain a desired pressure in fuel conduit 10 which is connected to the powerplant. Assume, for the purpose of illustration, that the powerplant is operating at a constant altitude condition. Since altitude is constant, the ambient atmospheric pressure will also be constant, and this pressure acting upon the effective area of evacuated bellows 23a produces a definite and constant upward force on the left hand end of member 38. Compression spring 42 exerts a definite and constant downward force on member 38 for a given position of said member, and these two forces combine to produce a definite and constant downward force on linkage member 36 through roller 45. For the previously mentioned equilibrium condition to exist, the effect of this downward force through roller 45 on linkage member 36 must be exactly balanced by the fuel pressure acting on the effective area of bellows 22a. During this condition of equilibrium, linkage member 36 and pilot valve 30a assume the positions shown in Fig. 2. If, for any reason, the pressure in conduit 10 becomes too low, this reduction in pressure is sensed by diaphragm 22a through sensing conduit 32 and the force balancing system thereby becomes momentarily unbalanced since nothing has occurred to change the magnitude of the combined bellows and spring force. Since this latter force is momentarily greater than the pressure force from the diaphragm, linkage member 36 will rotate slightly in a counterclockwise direction about pivot 49 and allow pilot valve 30a to move downward from the position shown in Fig. 2. As previously indicated, such movement establishes communication between passages 31 and 55 and fuel at the discharge pressure of pump 4 is admitted to piston 51. Piston 51 is thereby caused to move downward against spring 56 thus closing valve 25 and restricting the rate at which fuel is by-passed from pump 4. By restricting the rate at which fuel is by-passed from pump 4, a greater percentage of the fuel delivered by the pump is delivered to the powerplant through conduit 10, thus tending to increase the fuel pressure therein. The increase in pressure is sensed by diaphragm 22a through sensing conduit 32 and when the pressure again reaches the proper value to balance the combined effect of the bellows and spring force, pilot valve 30a has been returned to the position shown in Fig. 2 so as to interrupt the communication previously established between passages 31 and 55. In a like manner, pilot valve 30a is caused to move upward and establish communication between passages 55 and 54 when the pressure in conduit 10 becomes too great. When this occurs, the relatively high-pressure fuel at the upper side of piston 51 discharges to low pressure conduit 19 and allows valve 25 to open under the action of spring 56.

Still assuming operation of the powerplant at constant altitude, assume further that the operator selects a new operating condition by effecting a rotational movement of cam 24a. If such movement causes roller 45 to move to the left, a greater pressure force is required to be exerted by diaphragm 22a to balance the combined effect of the bellows force and the force of spring 42 since roller 45 is now nearer to pivot 43. Momentarily, the combined spring and bellows force will be greater than the diaphragm force thus causing pilot valve 30a to move down and thus close valve 25 in the manner previously described. When valve 25 has closed sufficiently to cause the pressure in conduit 10 to attain a higher pressure value corresponding to the new selected operating condition, the forces acting on member 36 will again be exactly balanced and pilot valve 30a and member 36 will return to the equilibrium position shown in Fig. 2. In a similar manner, if roller 45 is caused to move to the right or away from pivot 43, the momentary unbalance of forces causes an upward movement of pilot valve 30a and an opening of vave 25 until the pressure in conduit 10 falls to a lower pressure corresponding to the newly selected operating condition.

Still referring to Fig. 2, if the powerplant is operating at a constant preselected output condition, that is, a fixed position of roller 45, and the altitude is increased as is the case in an aircraft during climb, the combined spring and bellows force will be reduced because of the reduction in atmospheric pressure with increasing altitude. As in the previous illustrations, the force balancing system will become unbalanced temporarily, the greater diaphragm force causing an upward movement of pilot valve 30a thus allowing valve 25 to open to a greater degree and thereby reduce the pressure in conduit 10. In a similar manner, descent of an aircraft from high altitude causes an opposite action of pilot valve 30a and valve 25 to cause the pressure in conduit 10 to increase because of the increase in the atmospheric pressure.

*Manual control*

Linkage members 20, 21, 34, 35 represented diagrammatically by the broken lines in Fig. 1, connect the emergency control 7, main regulator 6, and stopcock 5 so that motion imparted to the adjusting means of any one of these components is likewise imparted to the other connected components. An operator's control lever 57 is connected by suitable linkage members 58, 59 to linkage member 35 at any convenient location. Thus any positional changes effected in the operator's control lever 57 will be imparted to all three components in the fuel system.

*Operation*

During normal operation and with the operator's control lever 57 in any position beyond the first 10–20 degrees of travel so that stopcock 5 is in the open position, fuel is pumped from reservoir 2 by the main pump 3 and delivered to the powerplant through connecting conduits 8—10. The rate of fuel flow is automatically governed by regulator 6 in accordance with the preselected output determined by the position of the operator's control lever. If operating conditions change, or if the operator selects a new position of his control lever, the condition responsive devices in regulator 6 co-act to produce a change in the variable control oil pressure output of the regulator, and this change in control oil pressure acting on the pump displacement control 16 effects the required change in the slope of the wobble plate with respect to the axis of variable displacement pump 3, thus increasing or decreasing the pumping rate.

Since constant displacement pump 4 is at all times connected to the powerplant and driven thereby, fuel will be drawn from conduit 8 through conduit 12 then through the pump and discharged to conduit 13 at all times when the powerplant is in operation. Thus, it will be seen that during operation of the powerplant fuel is always circulated through the pump 4 at a rate which is a function of the rotational speed of the powerplant. The pump delivers fuel through conduit 18 to regulator 7 during normal operation. At all times while the main components of the system are functioning properly, regulator 7 is arranged to maintain valve 25 in an open position so that fuel received from conduit 18 is discharged by the regulator into conduit 19 and thus returned to the inlet conduit 8. As the powerplant is operated at higher and higher altitudes the altitude compensating device 23 is arranged to unbalance the forces acting through linkages 26, 27 and 28 on the force balancer 29 in such a manner that servomotor 30 opens valve 25 to a greater degree thus increasing the rate at which fuel is by-passed from pump 4.

The emergency regulator 7 is scheduled to call for fuel pressures delivered to the powerplant in accordance with the schedule of regulator 6. However, for any given operating condition the schedule of pressures called for by regulator 7 is arranged to be slightly less than those called for by regulator 6 so that under normal conditions the fuel delivered to the powerplant is under the control of the main regulator 6. As the rate of by-pass fuel is restricted the delivery pressure of pump 4 increases and thus the pressure at stopcock 5 increases until a value is reached where the forces acting on force balancer 29 are in balance.

However, if regulator 6, pump displacement control 16, or main fuel pump 3 become inoperative temporarily, as for example, due to congealing of control oil, or in the event of failure of any of these components, the emergency regulator 7 automatically provides an uninterrupted supply of fuel at the proper pressure to the powerplant. In addition, since the fluid employed for actuating the servomotor portion of regulator 7 is the fuel itself, which does not freeze or congeal at ambient atmospheric temperatures sufficiently low to cause freezing or congealing of the control oil, my improved fuel system also provides means for starting and operation of the powerplant under these extreme atmospheric conditions when the main controls are often rendered temporarily inoperative.

While a particular embodiment of the invention has been illustrated and described, it will be obvious to those skilled in the art that various changes and modifications may be made without departing from the invention, and it is intended to cover in the appended claims all such changes and modifications as come within the true spirit and scope of the invention.

What I claim as new and desire to secure by Letters Patent of the United States is:

1. A fuel system for a thermal powerplant comprising fuel supply means, conduit means connecting said supply means to the powerplant and including a variable displacement pump and a constant displacement pump connected in parallel flow relation, hydraulically actuated means for regulating the flow of fuel to the powerplant including means for changing the displacement of said variable pump, conduit means for bypassing fuel in excess of that required for operation of the powerplant, and second regulating means connected in series flow relation with said bypass conduit means for varying the rate of flow of bypassed fuel, said second regulating means including valve means and valve positioning means connected to said valve means and operable in response to variations in the pressure of the fuel delivered to the powerplant.

2. A fuel system for a thermal powerplant comprising a fuel reservoir, conduit means connecting said reservoir to the powerplant and including a variable displacement pump and a constant displacement pump connected in parallel, said constant displacement pump being connected to the powerplant and driven thereby so that the rate of fuel delivered by said pump is proportional to the rotational speed of the powerplant, means for regulating the flow of fuel to the powerplant including hydraulically actuated means for varying the displacement of said variable pump, means including second conduit means and valve means for bypassing fuel delivered by the constant displacement pump at a variable rate, and fuel actuated fluid motor means connected to said variable bypass valve means and operable to increase the rate of bypass flow in response to an increase in the pressure of the fuel delivered to the powerplant and to decrease said rate of flow in response to a decrease in said pressure.

3. For use in a fuel supply system for an aircraft powerplant including a fuel reservoir, a variable displacement pump, conduit means connecting said pump to said reservoir and to the powerplant, a pump control of the hydraulically actuated type for varying the displacement of said pump as a preselected function of a variable control pressure, and a regulator of the type having means for supplying said control pressure to the pump control and including means for preselecting a rate of fuel flow to secure a desired output of the powerplant and a plurality of devices operable in response to a plurality of operating conditions of the powerplant to modulate said control pressure, the combination comprising a constant displacement pump connected in parallel flow relation with said variable pump, conduit means for bypassing fuel delivered by said constant displacement pump, flow regulating means in series with said bypass conduit means for controlling the rate of flow of bypassed fuel, said flow regulating means including means for preselecting a desired rate of bypass flow as a predetermined function of the pressure of fuel delivered to the powerplant and compensating means for increasing the rate of bypass flow as a predetermined function of altitude, an operator's control lever, and means connecting said preselecting means of said flow regulating means to the operator's control lever and to said regulator preselecting means.

4. Apparatus in accordance with claim 3 wherein the flow regulating means comprises valve means for controlling the flow of fuel in said bypass conduit means, and hydraulic servomotor means actuated by fuel delivered by said constant displacement pump and operable in response to changes in pressure of the fuel delivered to the powerplant and to changes in altitude for positioning said valve means.

5. Apparatus in accordance with claim 3 wherein the flow regulating means comprises valve means in said bypass conduit means, and hydraulic servomotor means actuated by fuel delivered by said constant displacement pump connected to said valve means and operable to open or close said valve means in response to an increase or decrease respectively in the delivery pressure of said parallel connected pumps and also operable to open said valve means in response to a decrease in the ambient atmospheric pressure.

NEIL BURGESS.

REFERENCES CITED

The following references are of record in the file of this patent:

UNITED STATES PATENTS

| Number | Name | Date |
| --- | --- | --- |
| 2,278,493 | Samiran | Apr. 7, 1942 |
| 2,296,876 | Samiran et al. | Sept. 29, 1942 |
| 2,350,781 | Lichte | June 6, 1944 |
| 2,408,836 | Warner | Oct. 8, 1946 |
| 2,440,663 | Ifield | Apr. 27, 1948 |

FOREIGN PATENTS

| Number | Country | Date |
| --- | --- | --- |
| 918,123 | France | Oct. 7, 1946 |